Figure 1:
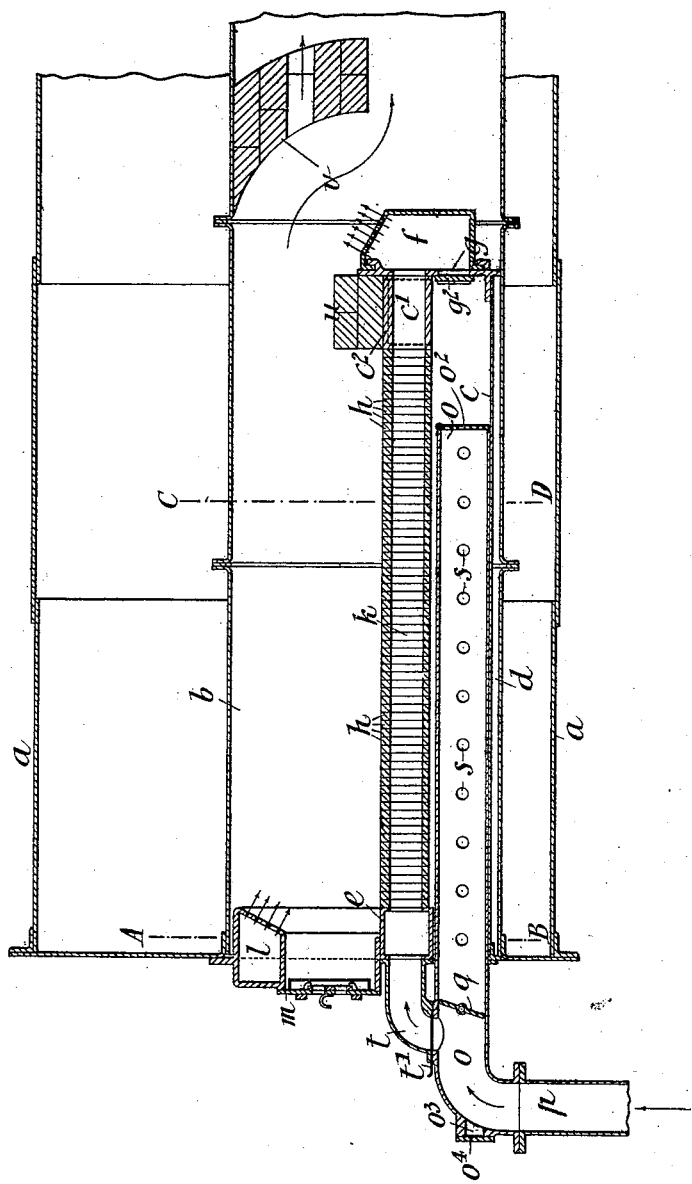

(No Model.) 7 Sheets—Sheet 1.

T. G. LISHMAN.
STEAM BOILER OR OTHER FURNACE.

No. 477,376. Patented June 21, 1892.

Witnesses. Inventor.
Thomas George Lishman (No Model.) 7 Sheets—Sheet 2.

T. G. LISHMAN.
STEAM BOILER OR OTHER FURNACE.

No. 477,376. Patented June 21, 1892.

Witnesses. Inventor.
Thomas George Lishman.

(No Model.) 7 Sheets—Sheet 3.
T. G. LISHMAN.
STEAM BOILER OR OTHER FURNACE.
No. 477,376. Patented June 21, 1892.
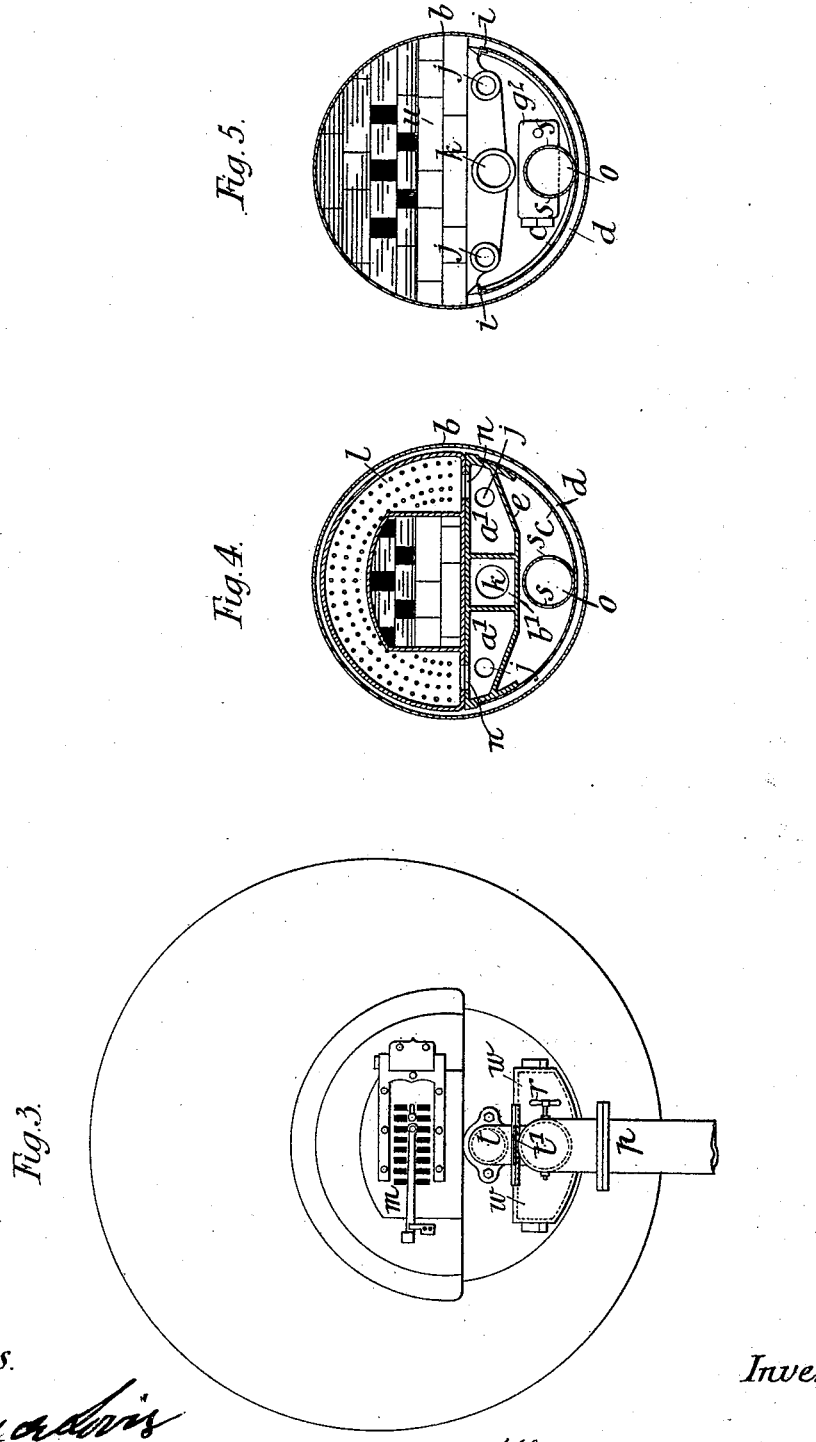
Witnesses.
Inventor.
Thomas George Lishman
by John J. Halsted & Son
his attorneys (No Model.) 7 Sheets—Sheet 4.
T. G. LISHMAN.
STEAM BOILER OR OTHER FURNACE.

No. 477,376. Patented June 21, 1892.

Witnesses.

Inventor.
Thomas George Lishman (No Model.) 7 Sheets—Sheet 5.

T. G. LISHMAN.
STEAM BOILER OR OTHER FURNACE.

No. 477,376. Patented June 21, 1892.

Witnesses. Inventor.

Thomas George Lishman.

(No Model.) 7 Sheets—Sheet 6.

T. G. LISHMAN.
STEAM BOILER OR OTHER FURNACE.

No. 477,376. Patented June 21, 1892.

Witnesses.

Inventor.
Thomas George Lishman (No Model.) 7 Sheets—Sheet 7.

T. G. LISHMAN.
STEAM BOILER OR OTHER FURNACE.

No. 477,376. Patented June 21, 1892.

Witnesses.

Inventor.

UNITED STATES PATENT OFFICE.

THOMAS GEORGE LISHMAN, OF BRISTOL, ENGLAND.

STEAM-BOILER OR OTHER FURNACE.

SPECIFICATION forming part of Letters Patent No. 477,376, dated June 21, 1892.

Application filed November 13, 1891. Serial No. 411,824. (No model.)

*To all whom it may concern:*

Be it known that I, THOMAS GEORGE LISHMAN, a subject of the Queen of Great Britain, residing at Bristol, England, have invented new and useful Improvements in Steam-Boiler and other Furnaces, of which the following is a specification.

My invention relates to the construction of furnaces generally, but is more especially applicable to steam-boiler furnaces.

In carrying out my invention I provide a curved plate placed along the bottom and following the shape of the boiler-flue. At each end of this plate is an air-chamber, the top of the inner air-chamber being formed with grates having narrow spaces or with perforations, from which heated air is distributed into the combustion-chamber at that point. On the said plate I fix angle-iron bars for carrying the grate or fire-bars, which I propose to make of cast metal and then chill them; or I may make them of a mixture of metal which will produce cast-steel or very hard metal, whereby clinker is prevented from adhering to them in the furnace, the said bars being arranged, by preference, transversely in the space between the two air-chambers, although they may, if desired, be arranged in sections placed longitudinally in the furnace. They are formed with a hole or holes through them, so that when placed together in position tubular communication is formed between the air-chambers. The air for perfecting combustion is passed from one air-chamber to the other through the tubular passage or passages, and is thereby highly heated by the time it is delivered into the fuel or combustion chamber. The inner air-chamber is placed in any suitable position in the flue and may be protected at the front or at the back and front by fire-brick walls or bridges. The front of the furnace may be also provided with a second air-chamber, forming the frame of the firing-door, from which hot air is distributed onto the fuel in the furnace. I also provide a pipe placed on the curved plate underneath the grate-bars and in communication at its outer end with a main air-conduit, the inner end being connected, when required, with the inner air-chamber. It is also provided with holes for the passage of air to the fuel. A connection is formed between this pipe and the front and back air-chambers. The inlet of the air, supplied by means of a fan or by other suitable means for obtaining air under pressure, is regulated by valves or by other suitable means.

When applying my improvements to existing steam-boilers, in which the ordinary draft is sufficient, I dispense with the means for obtaining a forced supply of air. In such cases I may, however, apply a steam-jet to the tubular air-passage for the purpose of causing a more rapid delivery of air into the air-chambers. The inner air-chamber can also be arranged to be used in conjunction with ordinary grates and furnaces.

To enable my invention to be fully understood, I will describe how it can be carried into practice by reference to the accompanying drawings, in which—

Figure 2:
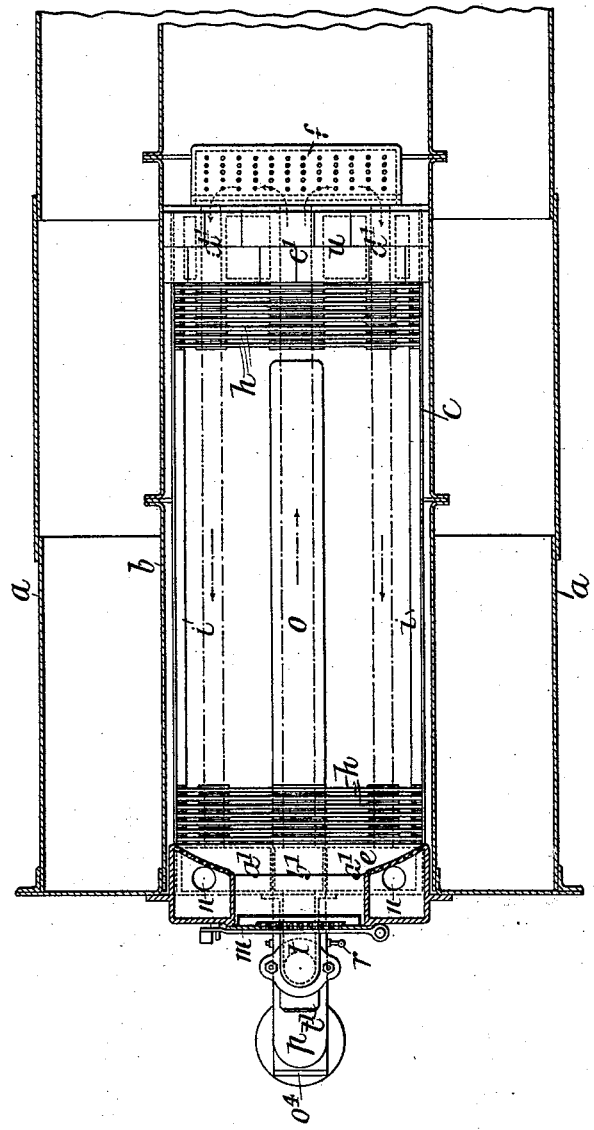
Figure 8:
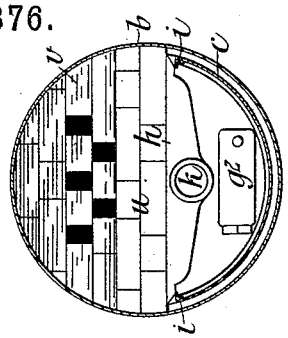
Figure 7:
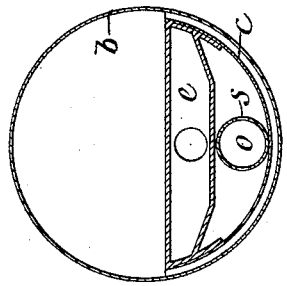
Figure 6:
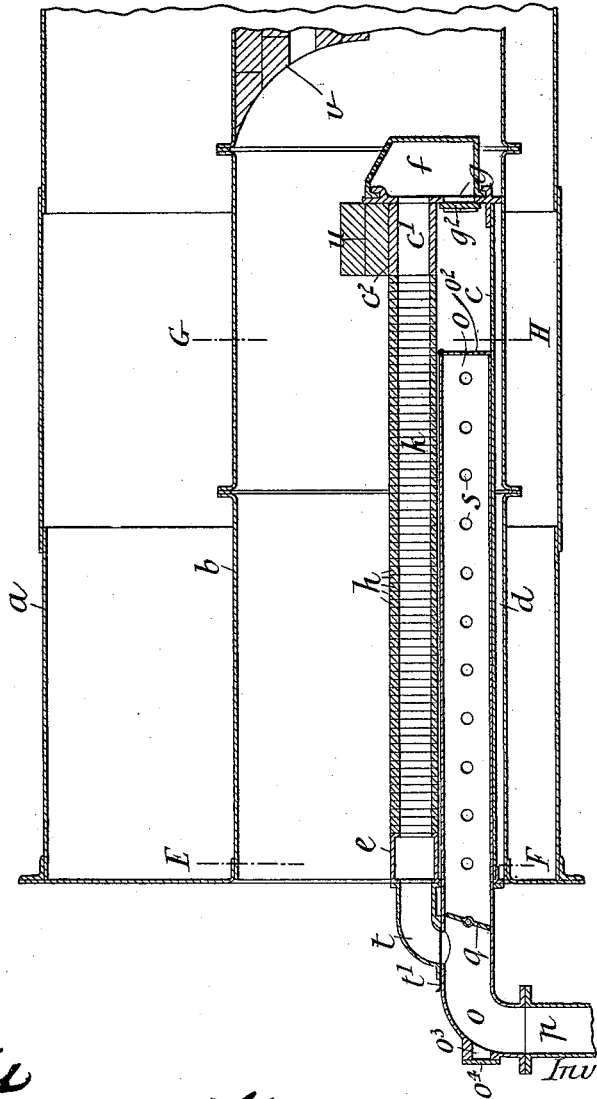
Figure 11:
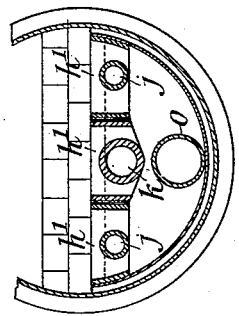
Figure 9:
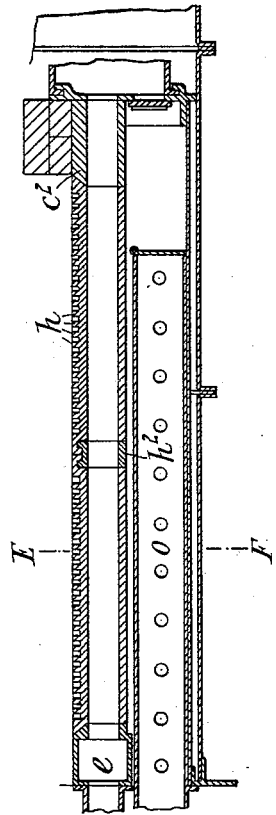
Figure 10:
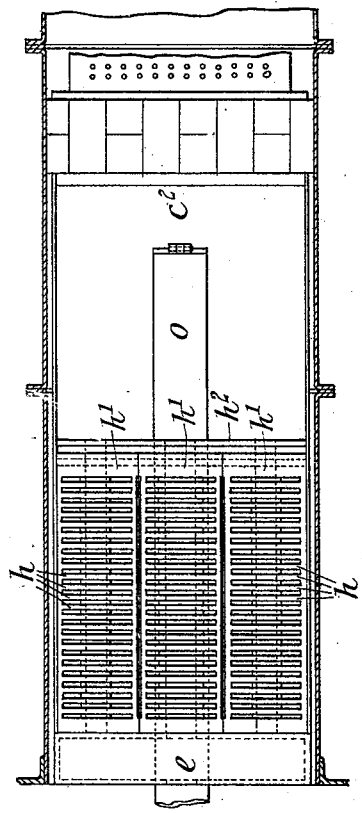
Figure 12:
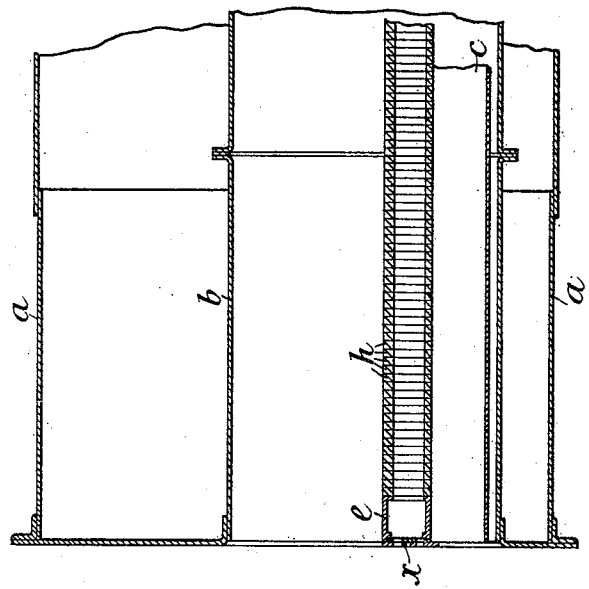
Figure 13:
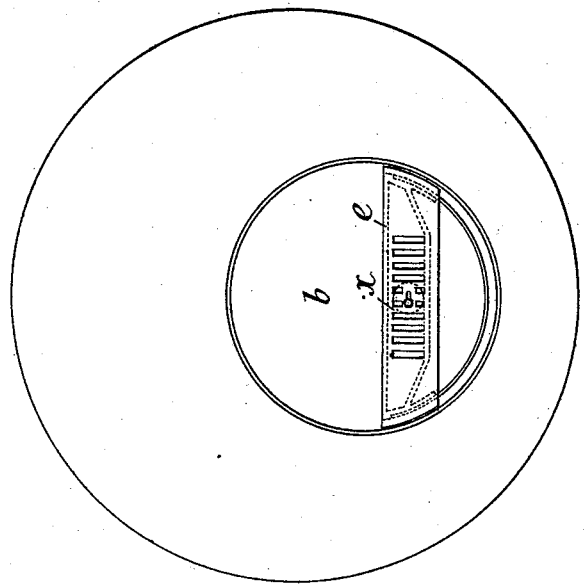
Figure 14:
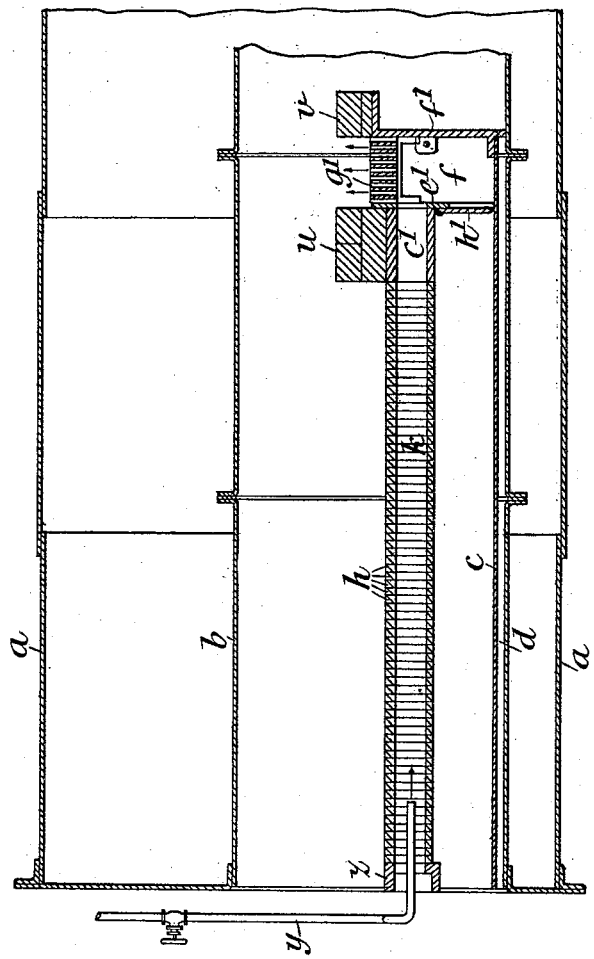

Figure 1 is a longitudinal section of a steam-boiler having a furnace constructed according to my invention. Fig. 2 is a horizontal section, and Fig. 3 is a front end elevation of the same. Figs. 4 and 5 are sections on the lines A B and C D, respectively, of Fig. 1. Fig. 6 is a similar view to Fig. 1, but showing my improvements applied to a boiler-furnace having ordinary fire-doors when using a forced draft. Figs. 7 and 8 are sections on the lines E F and G H, respectively, of Fig. 6. Fig. 9 is a longitudinal section, and Fig. 10 is a horizontal section, of part of a boiler-flue embodying my improvements and showing the fire-bars cast in sections placed longitudinally in the furnace. Fig. 11 is a section on the line E F of Fig. 9. Fig. 12 is a longitudinal section of as much of a steam-boiler having ordinary fire-doors as is necessary to illustrate the application of my improvements when using a natural draft. Fig. 13 is a front end elevation of the boiler. Fig. 14 is a longitudinal section of a steam-boiler having ordinary fire-doors and provided with a steam-jet applied to my tubular air-passage.

Similar letters in all the figures indicate similar or corresponding parts.

Referring to Figs. 1 to 5, which show my improvements in furnaces applied to a Cornish boiler, *a* is the shell of the boiler, and *b* is the flue thereof.

*c* is the plate, which I provide along the bottom of the boiler-flue $b$, such plate being curved to follow the shape of the said flue, as clearly seen in Figs. 4 and 5, and a space $d$ being advantageously left between the plate and the flue.

$e$ is the air-chamber secured to the front end of the curved plate $c$ and divided by partitions into three parts $a'$, $a'$, and $b'$. $f$ is the air-chamber at the rear end of the said plate, such chamber $f$ consisting of a box perforated on its top side and secured to a plate $g$, fixed to the curved plate $c$.

$g^2$ is a door for allowing the chamber $f$ to be cleared of ashes.

$h\ h$ are the fire-bars placed transversely in the boiler-flue $b$ and supported at each of their ends on an angle-iron bar $i$, fixed to the curved plate $c$.

$j$, $j$, and $k$ are the holes formed in bosses in the fire-bars $h$, which holes, when the bars are placed in position in the furnace, form tubular passages, the passage constituted by the holes $k$ in the middle of the bars forming, with a hole $c'$ in a plate $c^2$, a communication between the middle part $b'$ of the outer air-chamber $e$ and the inner air-chamber $f$, while the two passages formed by the holes $j j$ near the ends of the bars $h$ and by holes $d'\ d'$, also in the plate $c^2$, effect communication between the inner air-chamber $f$ and the two parts $a'\ a'$, respectively, of the outer air-chamber $e$. The plate $c^2$ is supported on the angle-irons $i i$.

$l$ is the second air-chamber, which I advantageously provide at the front of the furnace and which forms the frame of the firing-door $m$. The said chamber $l$ communicates by means of the holes $n\ n$ with the parts $a'\ a'$ of the air-chamber $e$, and is perforated on the side which faces the fuel-chamber.

$o$ is the pipe, which I place on the curved plate $c$ underneath the fire-bars $h$, and $p$ is the main air-conduit, with which it communicates at its outer end, the said air-conduit deriving the air-supply from a blast-fan or other suitable apparatus. (Not shown in the drawings.)

$q$ is a valve operated by a handle $r$ for regulating the quantity of air forced into the pipe $o$.

$s\ s$ are the holes in the pipe $o$ for the passage of air up between the bars $h\ h$ to the fuel.

$o^2$ is a hinged flap for allowing any ashes which may pass through the holes $s$ into the tube $o$ to be pushed out by means of a rake introduced through an opening $o^3$, closed by a cover $o^4$. The air-chamber $e$ is connected by a pipe $t$ (having a sliding valve $t'$) with the main air-conduit $p$. The air-chamber $f$ is protected from the fire by a bridge $u$ at the front supported on the plate $c^2$.

$v$ is a perforated bridge depending from the top of the flue $b$ at the rear of the chamber $f$, the said bridge serving to direct the gases from the fuel into more intimate contact with the hot-air issuing from the chamber $f$, thereby insuring thorough combustion.

It will be seen that the whole of the front of the furnace is closed in, the firing-door $m$, however, being made hollow. Its inner side is perforated, and its outer side is fitted with a hit-and-miss grating to allow outside air, when required, to be admitted direct to the fuel-chamber. Doors $w$ are also fitted to the front of the furnace at the lower part for allowing access to the ash-pit. With this construction, if the valves $t'$ and $q$ be open a portion only of the air forced by the fan or the like through the main air-conduit $p$ passes in the direction indicated by the arrows in Figs. 1 and 2 through the pipe $t$ into the central part $b'$ of the chamber $e$, and thence through the central tubular passage $k$ in the fire-bars $h$ and the pipe $c'$ to the air-chamber $f$. A portion of the air which has become highly heated during its passage through the fire-bars passes out through the perforations in the chamber $f$ and mingles with the gases from the fuel. The remainder of the air passes through the side tubular passages $j\ j$ in the fire-bars $h$ to the parts $a'\ a'$ of the chamber $e$, and thereby becomes more highly heated. The air then passes through the holes $n\ n$ into the chamber $l$, whence it issues onto the burning fuel. A portion of the air coming from the main air-conduit $p$ passes into the pipe $o$ and is distributed through the holes $s\ s$ underneath the fire-bars $h$. By entirely closing the valve $q$ of course the whole of the air-blast can be directed through the furnace-bars.

When the furnace is intended for burning anthracite coal, I find it advantageous to connect the inner end of the pipe $o$ with the air-chamber $f$ and to disconnect the outer end of such pipe from the air-chamber $e$. By this means a greater quantity of air is caused to pass directly through the fuel from beneath the grate-bars. In this case the middle air-passage in the fire-bars would not be required. The pipe $o$ can, if required, be dispensed with, the air to the under side of the bars then being supplied by natural draft.

It will be obvious that the front air-chamber $e$ can, if required, be so connected with the main air-conduit that the air shall be forced therefrom through all the passages in the fire-bars to the back air-chamber $f$, so that the whole of the air will be delivered at the back end of the furnace. The air-chamber $l$ in this case could of course be dispensed with.

The arrangement illustrated in Figs. 6, 7, and 8 is the same as that hereinbefore described with reference to Figs. 1 to 5, except that the usual front frame and doors of the furnace are retained. (These, however, are not shown in the drawings.) There is therefore no second air-chamber in this arrangement, and the side passages in the fire-bars and corresponding compartments in the front air-chamber $e$ are consequently not required. The heated air is in this case only delivered at the back of the furnace.

If required, the pipe $o$ may communicate directly with the inner air-chamber $f$, as well as with the outer air-chamber $e$, a regulating-valve being in this case provided to control the passage of air to the said chamber.

In Figs. 9 to 11 several fire-bars $h\,h$ are shown cast together, so as to form a grate made up of sections $h'\,h'$, placed longitudinally in the flue. The front sections are supported upon the front air-chamber and a transverse bridge or bar $h^2$, and the rear sections are supported by the said bridge or bar and by the plate $c^2$. $j\,j$ and $k$ are the tubular passages in the fire-bars.

When applying my furnace to steam-boilers having ordinary fire-doors and worked with natural draft, as shown in Figs. 12 and 13, I employ the two air-chambers $e$ and $f$ and the fire-bars having tubular passages connecting the said chambers arranged in the same manner, as shown in Figs. 6, 7, and 8; but the conduit for the fan-blast, with its pipe connecting the front air-chamber thereto, and the pipe beneath the fire-bars are of course not required. The air is advantageously admitted to the air-chamber $e$ through a regulating or hit-and-miss grating $x$. This arrangement I have found to be very satisfactory as far as regards the prevention of smoke; but the economical results are not so good as in the arrangement hereinbefore described, and illustrated in Figs. 1 to 5.

In the modification shown in Fig. 14, in which a steam-jet supplied by a pipe $y$ is applied, when required, to the boiler-furnace worked by natural draft for the purpose of causing a more rapid delivery of air into the air-passage in the fire-bars, I dispense with the front air-chamber and employ instead thereof a casting $z$, fitted to the front plate of the furnace.

Instead of employing a perforated box to form the inner air-chamber $f$, as hereinbefore described, the said chamber may be formed of two plates $e'$ and $f'$, the latter supporting a rear fire-bridge $v$. The top of the chamber consists of a grating $g'$, (or a perforated plate,) through which the heated air issues in the direction of the arrows to mingle with the gases as they pass over the fire-bridges $u$ and $v$.

$h'$ is a flap valve or door for regulating the admission of air to and clearing out the ashes from the chamber $f$.

In all cases suitable provision is made—such as openings covered by doors—to allow access to the air-chambers.

By my invention I insure a perfect combustion of the gases and effect considerable economy in fuel and complete prevention of smoke.

I have shown my improvements, by way of example, applied to the furnaces of steam-boilers; but it will be understood without description or illustration that they are equally applicable to other furnaces.

Having now particularly described and ascertained the nature of my said invention and in what manner the same is to be performed, I declare that what I claim is—

1. The described improved grate or grouped fire-bars for steam-boilers or other furnaces, made of a series of bars $h$, placed transversely in the boiler-flue and each having the transverse openings $j, j$, and $k$ therein, such openings coinciding, respectively, as set forth, when the bars are placed side by side, and thus constituting a system of tubular passages in directions transverse of the bars.

2. A steam-boiler or other furnace having its fire-grate constructed of solid bars placed transversely of the furnace and furnished each with the respective openings $j\,j\,k$ therein, the central opening $k$ constituting a passage having communication between the middle part of an outer chamber $e$ and the inner chamber $f$, and the openings $j\,j$ constituting passages effecting communication between the inner chamber $f$ and the parts $a'\,a'$ of the outer chamber.

3. In a steam-boiler or other furnace, the combination of air-chambers, such as $e, f$, and $l$, with the fire-bars $h$, and curved plate $c$ for heating air and distributing it in the furnace, substantially as hereinbefore described, and illustrated in the accompanying drawings.

THOMAS GEORGE LISHMAN.

Witnesses:
W. BRUCE LOVIE,
H. EVANS,
    28 *Queen Street, Cardiff.*